(12) United States Patent
Denoue et al.

(10) Patent No.: US 7,474,807 B2
(45) Date of Patent: Jan. 6, 2009

(54) SYSTEM AND METHOD FOR GENERATING USABLE IMAGES

(75) Inventors: Laurent Denoue, Palo Alto, CA (US); Tina Schneider, San Francisco, CA (US); Jonathan Helfman, Half Moon Bay, CA (US); Gene Golovchinsky, Palo Alto, CA (US); Candace Kamm, Mountain View, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 863 days.

(21) Appl. No.: 10/783,157

(22) Filed: Feb. 20, 2004

(65) Prior Publication Data

US 2005/0185860 A1    Aug. 25, 2005

(51) Int. Cl.
*G06K 9/60* (2006.01)
(52) U.S. Cl. ............... 382/305; 382/277; 382/282; 382/307; 707/3; 707/7
(58) Field of Classification Search ................ 382/209, 382/219, 278, 305; 707/3, 6, 7
See application file for complete search history.

(56) References Cited

U.S. PATENT DOCUMENTS

| | | | | | |
|---|---|---|---|---|---|
| 5,819,288 | A | * | 10/1998 | De Bonet | 707/2 |
| 5,852,832 | A | * | 12/1998 | Voigt et al. | 4/237 |
| 5,899,999 | A | * | 5/1999 | De Bonet | 707/104.1 |
| 5,907,704 | A | * | 5/1999 | Gudmundson et al. | 717/100 |
| 6,049,362 | A | * | 4/2000 | Butter et al. | 348/699 |
| 6,161,107 | A | * | 12/2000 | Stern | 707/104.1 |
| 6,199,060 | B1 | * | 3/2001 | Gustman | 707/3 |
| 6,335,985 | B1 | * | 1/2002 | Sambonsugi et al. | 382/190 |
| 6,532,301 | B1 | * | 3/2003 | Krumm et al. | 382/170 |
| 6,640,145 | B2 | * | 10/2003 | Hoffberg et al. | 700/83 |
| 6,678,474 | B1 | * | 1/2004 | Masuda et al. | 398/75 |
| 6,697,061 | B1 | * | 2/2004 | Wee et al. | 345/419 |
| 6,761,405 | B2 | * | 7/2004 | Bellefleur | 297/270.1 |
| 6,817,982 | B2 | * | 11/2004 | Fritz et al. | 600/443 |
| 6,947,162 | B2 | * | 9/2005 | Rosenberg et al. | 358/1.15 |

OTHER PUBLICATIONS

Agarwala, Aseem, "SnakeToonz: A Semi-Automatic Approach to Creating Cel Animation from Video," Non-Photorealistic Animation and Rendering (NPAR) 2002.
Barrett, William A., et al., "Object-Based Image Editing," Association for Computing Machinery, Inc., SIGGRAPH 2002, pp. 777-784.
Igarashi, Takeo, et al., "Pegasus: A Drawing System for Rapid Geometric Design," Proceedings of CHI 98.

(Continued)

*Primary Examiner*—Yosef Kassa
(74) *Attorney, Agent, or Firm*—Fliesler Meyer LLP

(57) ABSTRACT

The present invention includes systems, methods, and computer readable media for locating, sorting, and modifying images for future use. A conversion engine submits search requests to an image search engine and accepts the received results. The conversion engine arranges the search results according to selected visual characteristics of the image. Editing tools can then convert the results of the image search into vector based images which can be easily manipulated and enable users to modify the re-ranked images for future use.

22 Claims, 9 Drawing Sheets

OTHER PUBLICATIONS

Mortensen, Eric N., et al., "Intelligent Scissors for Image Composition," Proceedings of SIGGRAPH 95, 1995, pp. 191-198.

Noble, Samuel G., "Turing Images into Simple Line-Art," Thesis presented to the Division of Mathematics and Natural Sciences, Reed College, Dec. 2001.

Pavlidis, Theo, et al., "An Automatic Beautifier for Drawings and Illustrations," Computer Graphics, vol. 19, No. 3, 1985, pp. 225-234.

Reese, J. et al., "Image Editing with Intelligent Paint," Proceedings of Eurographics 2002, Sep. 2002.

Salisbury, Michael P., et al., "Orientable Textures for Image-Based Pen-and-Ink Illustration," Proceedings of SIGGRAPH 97, in *Computer Graphics* Proceedings, Annual Conference Series, Aug. 1997, pp. 401-406.

Santella, Anthony, et al., "Abstracted Painterly Renderings Using Eye-Tracking Data," In the International Symposium on Non-Photorealistic Animation and Rendering (NPAR) 2002, pp. 75-82.

Saund, Eric, et al., "Perceptual Organization as a Foundation for Intelligent Sketch Editing," 2002 American Association for Artifical Intelligence, Spring Symposium on Sketch Understanding.

Shpitalni, M., et al., "Classification of Sketch Strokes and Corner Detection Using Conic Sections and Adaptive Clustering," Trans. of ASME Journal of Mechanical Design, vol. 119, No. 2, pp. 131-135.

* cited by examiner

SYSTEM AND METHOD FOR GENERATING USABLE IMAGES

FIELD OF THE INVENTION

The present invention relates generally to image processing and particularly to systems and methods for obtaining and modifying images extracted from remote sources.

BACKGROUND OF THE INVENTION

Computer generated documents have historically, like their pre-computer counterparts, contained only text. However, during the past 5-10 years, as computer hardware has become more powerful, storage capacities have increased, and presentation software has become more sophisticated, users have begun to introduce images into documents and presentations.

However, finding images appropriate for a particular presentation is often prohibitively difficult. Users can generate the images themselves, but this process requires that the users have advanced facility with an image generation program and the time necessary to produce an image of reasonable presentation quality. Users can use a pre-generated image, but locating appropriate images is extremely difficult and time consuming. Pre-existing images can be modified, but a pixel by pixel modification process is often nearly as time consuming as generating the image from scratch.

What is needed is a mechanism for obtaining pre-existing images and converting them to a format that allows them to be easily modified.

SUMMARY OF THE INVENTION

The present invention includes systems, methods, and computer readable media for locating, sorting, and modifying images for future use. A conversion engine submits search requests to an image search engine and accepts the received results. The conversion engine arranges the search results according to selected visual characteristics of the image. Editing tools can then convert the results of the image search into vector based images which can be easily manipulated and enable users to modify the re-ranked images for future use.

DETAILED DESCRIPTION

Figure 1:
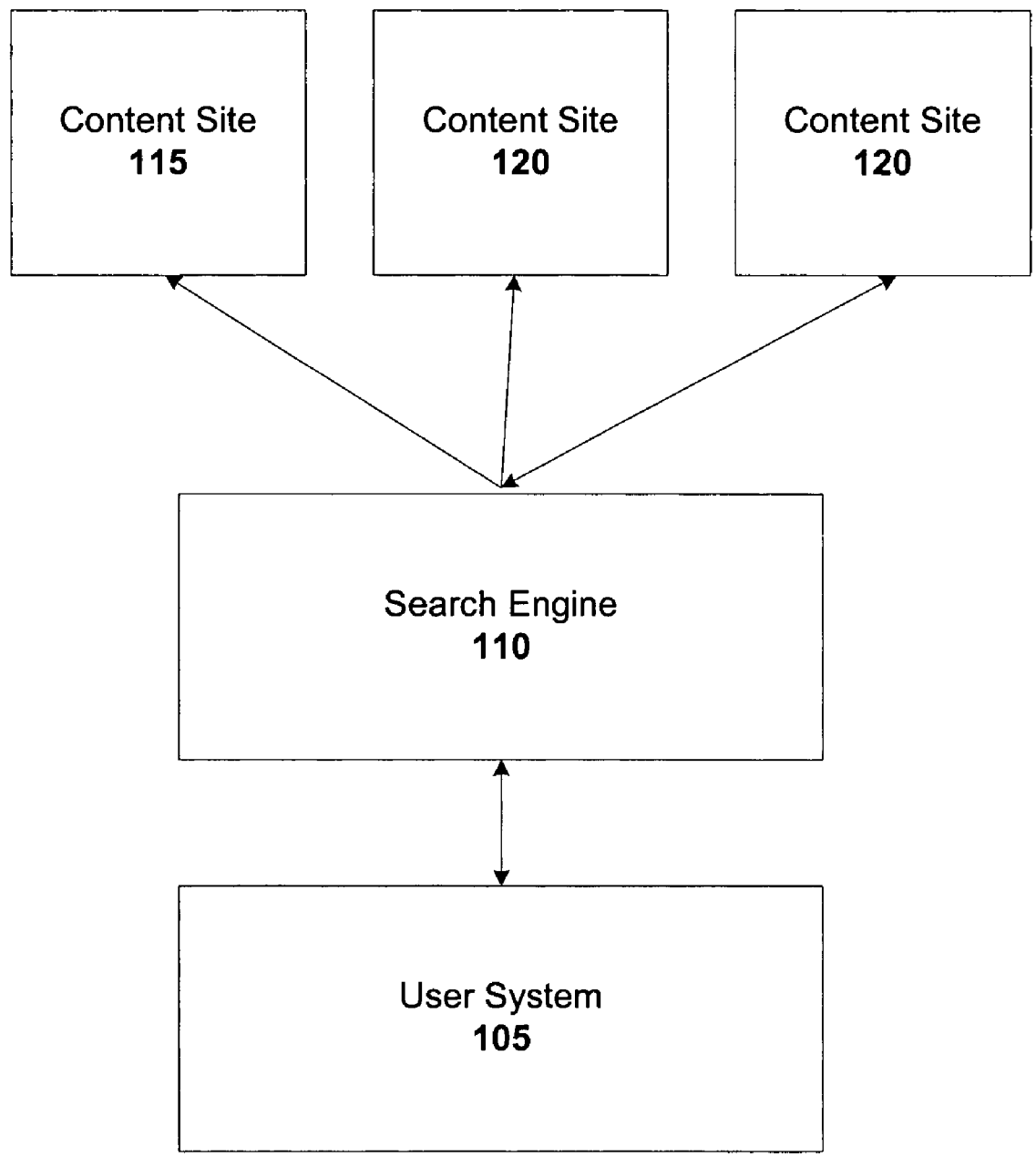
FIG. 1 is a block diagram illustrating the interaction between a user system, a search engine and several content sites.

The present invention includes systems, methods, and computer readable media for locating, sorting, and modifying images for future use. FIG. 1 is a block diagram illustrating the interaction between a user system, a search engine and several content sites. A user system 105 is preferably a workstation at which a user is attempting to generate a document or presentation augmented with images. A query for images is submitted from the user system 105 to a search engine 110.

The search engine 110 is a commercial or private search engine such as Google or Alta Vista, which maintains a catalogue of images. The images are indexed by description, size, content maturity, and any other applicable criteria. Alternately, the search engine 110 can be an internal search program which searches through internal search collections such as previously downloaded images or stored Power Point slides. The search engine 110 returns links to the images to the user system 105. The user system 105 downloads the links and retrieves the images from the content sites 115,120, 125. The user system 105 then converts the raw image files to a vector based format. The user system 105 then reorders the images according to user selected criteria such as their ease of modifiability, image style, or similarity to previously downloaded images. Image qualities such as file type, histogram characteristics, number of colors, number and length of edges, and number and length of segments, number and area of image sections, and any other applicable features are used to determine modifiability. The user system 105 returns to the user modified search results based upon these criteria. In one embodiment, the user system 105 provides a transparent interface to the user, presenting the modified results to the user as if they were returned directly by the search engine 110. The user system 105 then enables the user to modify the downloaded images and integrate them into documents and presentations.

Figure 2:
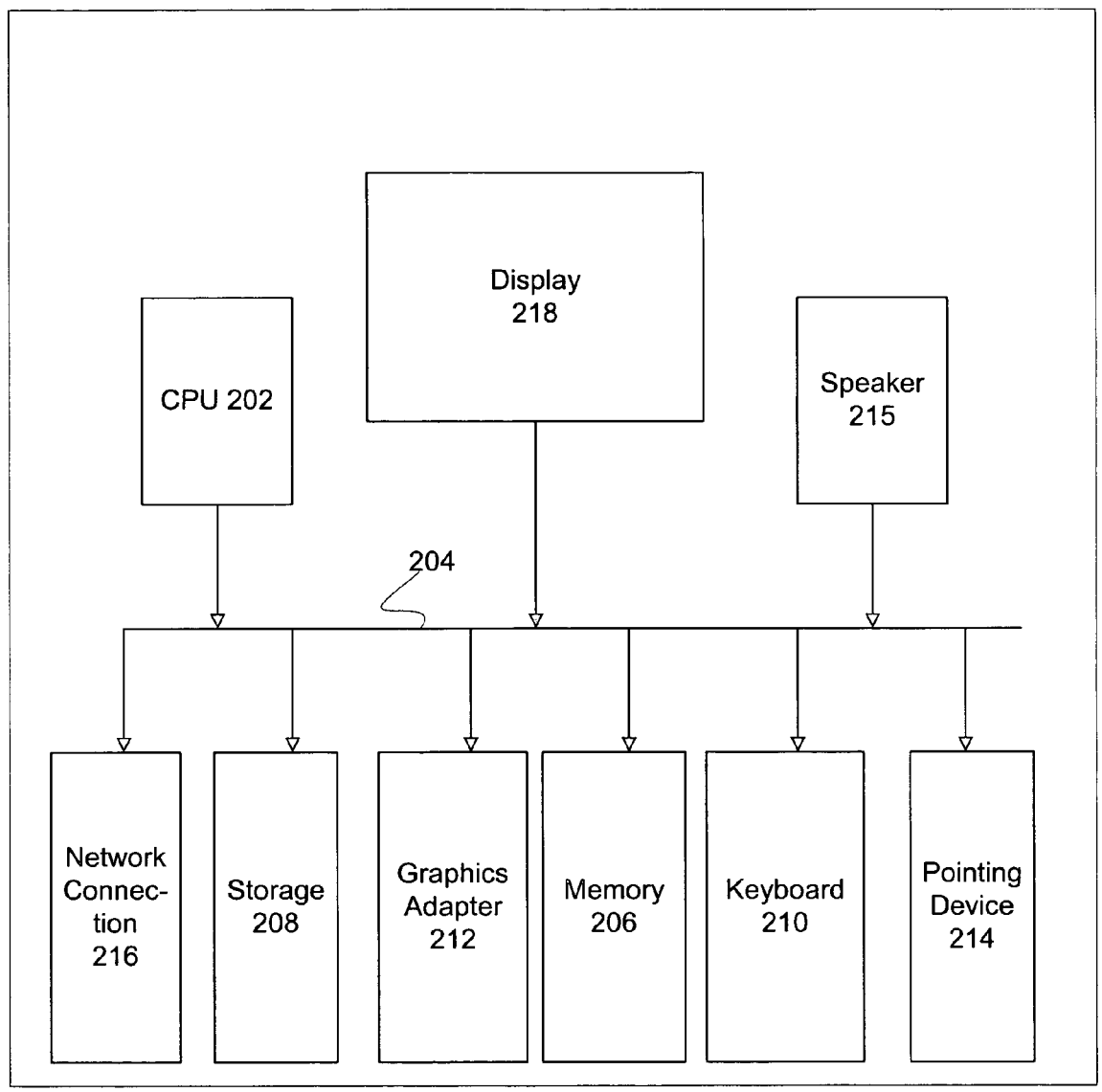
FIG. 2 is a block diagram illustrating a computer that acts as a user system

FIG. 2 is a block diagram illustrating a computer that acts as a user system 105. The system includes a processor 202. There may be more than one processor 202. Also coupled to the bus 204 are a memory 206, a storage device 208, a keyboard 210, a graphics adapter 212, a pointing device 214, a speaker 215, and a network adapter 216. A display 218 is coupled to the graphics adapter 212.

The processor 202 may be any specific or general-purpose processor such as an INTEL x86 or POWERPC-compatible central processing unit (CPU). The storage device 208 may be any device capable of holding large amounts of data, such as a hard drive, compact disk read-only memory (CD-ROM), DVD, or some other form of fixed or removable storage device.

Figure 3:
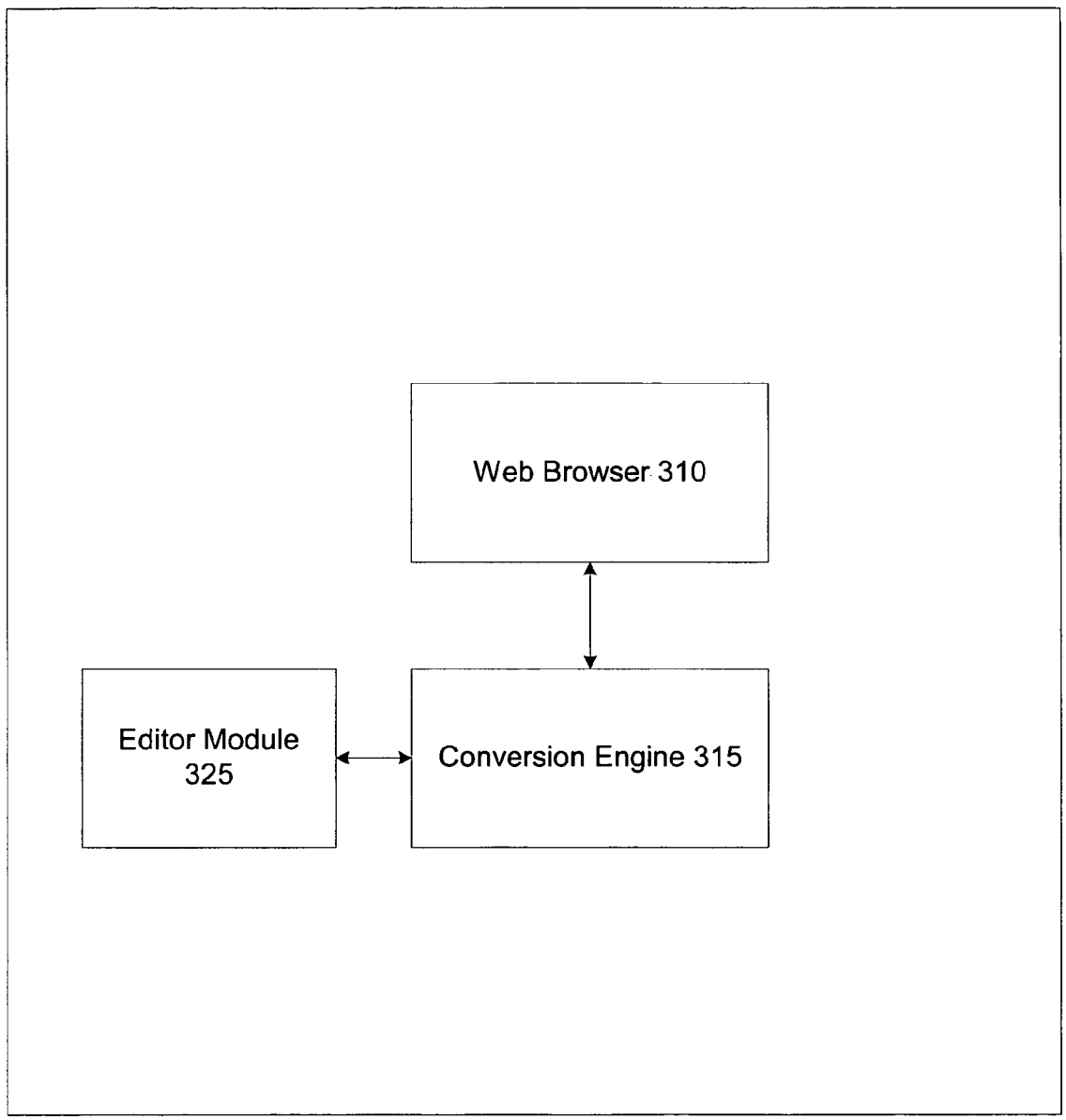
FIG. 3 is a block diagram illustrating a closer view of a memory of the user system.

FIG. 3 is a block diagram illustrating a closer view of a memory 206 of the user system. The memory includes a web browser 310. The web browser 310 is conventional and is configured to enable users to navigate to search engines 110 and submit searches for text or images.

A conversion engine 315 is configured to receive image search results received from the content sites 115,120, 125. Receiving the image may involve connecting to the search engine through a search engine API or intercepting results transmitted by the search engine. When the results of an image search are returned, the conversion engine 315 parses the links for the searched images and downloads the source images. The conversion engine 315 then converts the images to a modifiable format. The conversion engine 315 may use a commercial vectorization package such as Free Soft Silhouette or Streamline from Adobe or a proprietary mechanism that converts raw images to a more easily modifiable format.

The conversion engine 315 then reorders the search results according to predefined criteria such as an ease of modification, image type, similarity to previously retrieved images or some other assigned criteria. The image type can include a particular style of image (cartoon, drawing, etc) or other, previously defined criteria. Image qualities such as file type, histogram characteristics, number of colors, number and length of edges, number and length of segments, number and area of image sections, and any other applicable features are used by the conversion engine 315 to rank the results.

The conversion engine 315 then provides the reordered results to the user. An editor module 325 is configured to modify the results. The editor module 325 is configured to present the object in vector format to allow the edges and lines to be manipulated as objects rather than collections of pixels. In one embodiment, the images are represented as connected segments of Bezier curves.

Figure 4:
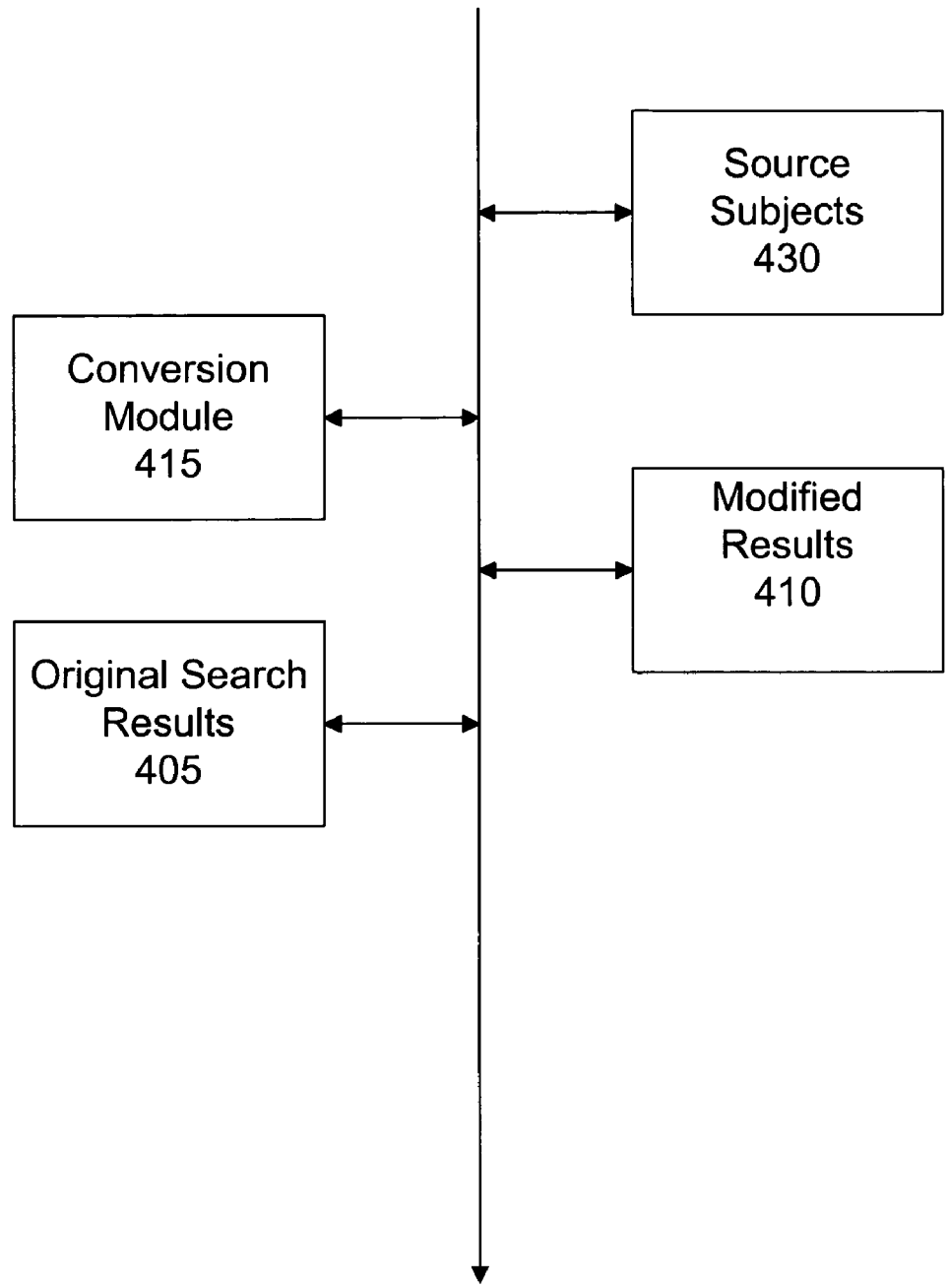
FIG. 4 is a block diagram illustrating a closer view of a conversion engine.

FIG. 4 is a block diagram illustrating a closer view of a conversion engine. The conversion engine includes original search results 405 which are the hyperlink values and raw image files that are generated by an original user search.

The conversion module 415 extracts the raw image files in the search results 405 which may be in BMP, JPG, GIF or any other format and converts the images to a modifiable format. The conversion engine 315 may use a commercial vectorization package such as Free Soft Silhouette or Streamline from Adobe or a proprietary mechanism that converts raw images to a more easily modifiable format.

The reorder module 420 reorders the search results according to an ease of modifiability. Image qualities such as file type, histogram characteristics, number of colors, number and length of edges, number and length of segments, number and area of image sections, and any other applicable features are used by the reorder module 420 to organize the results. The reorder module 420 applies a weighted analysis, considering various modifiability indicators, as well as an image's ranking in the original search results. The weights assigned to various factors can be designated by a user, or preconfigured. The reorder module 420 stores the reordered search in the modified results 410. The modified results 410 are preferably formatted searches that are configured to appear as search results presented by the search engine 110.

The conversion engine 315 also stores source subjects 430 that are used to generate searches. The source subjects 430 gather information about documents that have recently been generated and store suggested searches based upon those documents. For example, if a user were preparing a Power Point presentation on cell phones, the source subjects would detect the Power Point presentation and suggest "cell phone" as a potential title. The search information can be generated by a custom plug-in program that extracts text from slides as it is being generated and use the text in ongoing queries.

Figure 5:
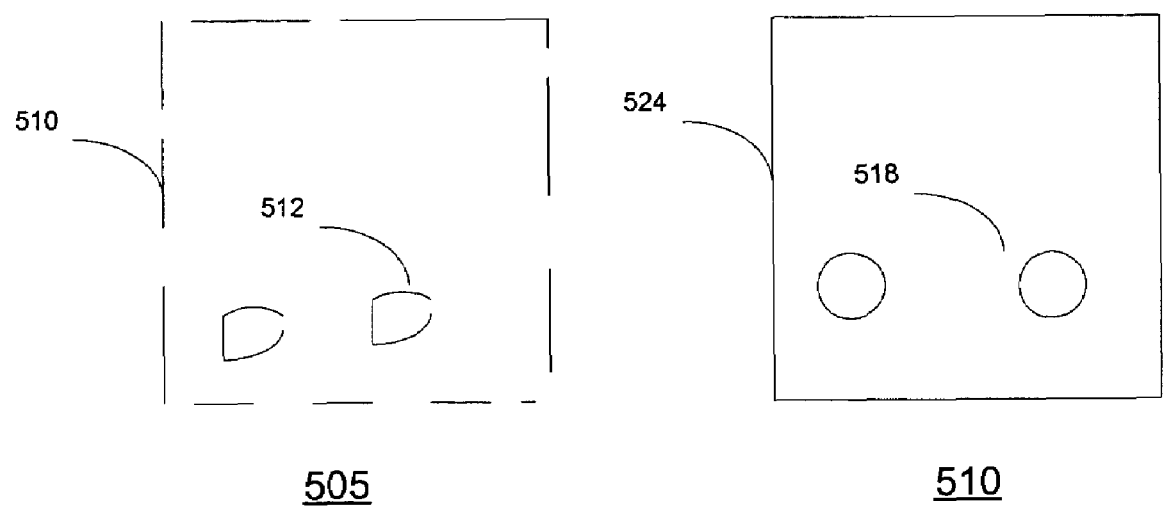
FIG. 5 is a diagram illustrating an image before and after modification.

FIG. 5 is a diagram illustrating an image before and after modification. An unmodified image 505 is generated from a raw image file such as a JPG or GIF file stored in the search results 405. The conversion module 425 extracts the gathered images from the search results and stores it as a group of segments which are represented as vectors.

The conversion module 425 then modifies the image 505 for ease of future manipulation. The conversion module 425 groups together segments that are parallel and close as single segments. For example, the conversion module 425 would recognize the outside edge 510 of the unmodified image 505 as part of a single border and convert the fragmented segments 510 into a single segment 524.

Figure 6:
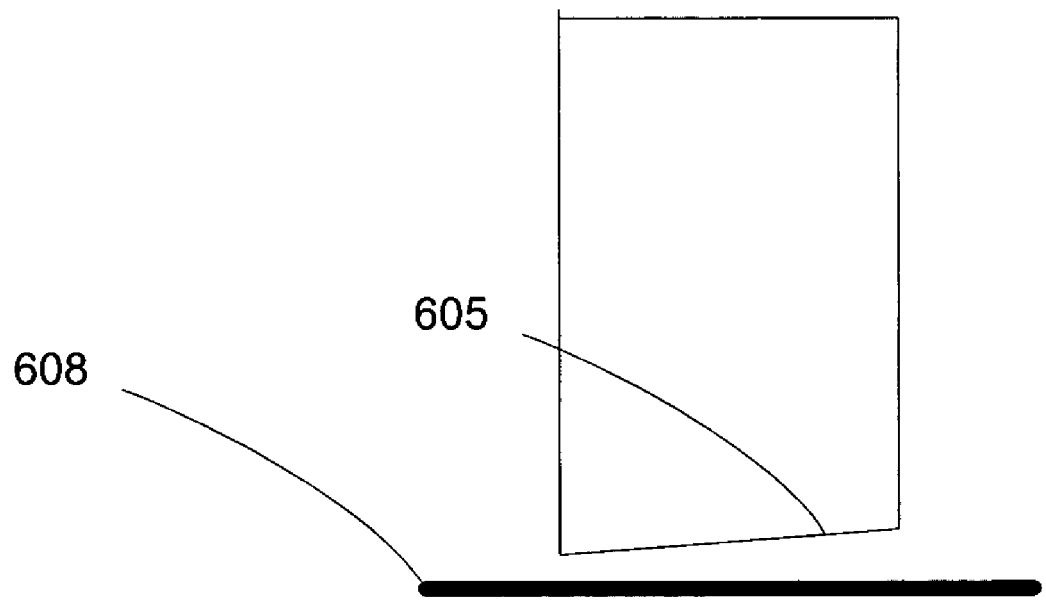
FIG. 6 is a diagram illustrating an image which can be modified by a user.
Figure 6:
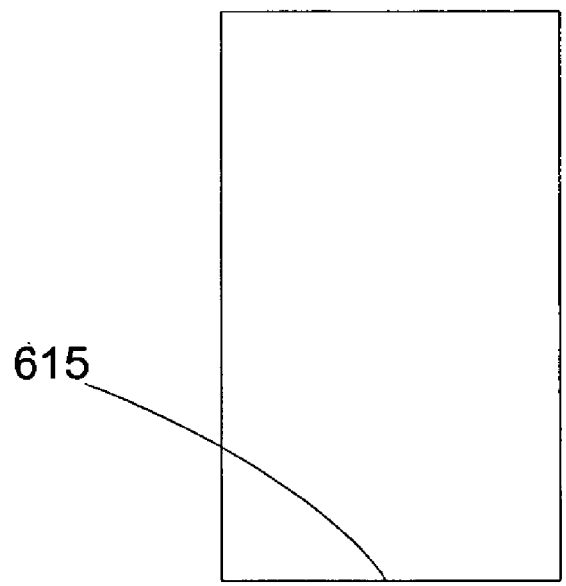

The conversion module is also configured to recognize non-linear shapes and adjust them. The conversion module checks groups of associated fragments 512, and generates a best fit Bezier curve for the fragments. Thus collections of segments representing round objects 512, can be recognized as associated and replaced with single whole segments 518. The modified images are then reranked and stored in the modified results FIG. 6 is a diagram illustrating an image which can be edited by a user. The unedited image 605 has been stored in a vector-based format and has preferably been modified according to the procedure illustrated in FIG. 5. Since the modified results 410 store the images as collections of curve objects rather than pixel data, the editor module 325 is configured to allow for the adjustment of curve and line segments. By submitting a "draw over" segment 608 a user can select a segment to be modified. The editor module 325, by checking the location of the draw-over segment 608, determines the segment 605 to be modified. The user can then perform line-alteration operations on the segment and produce an edited 615 version of the object 600 having an altered version 610 of the selected line 605.

Figure 7:
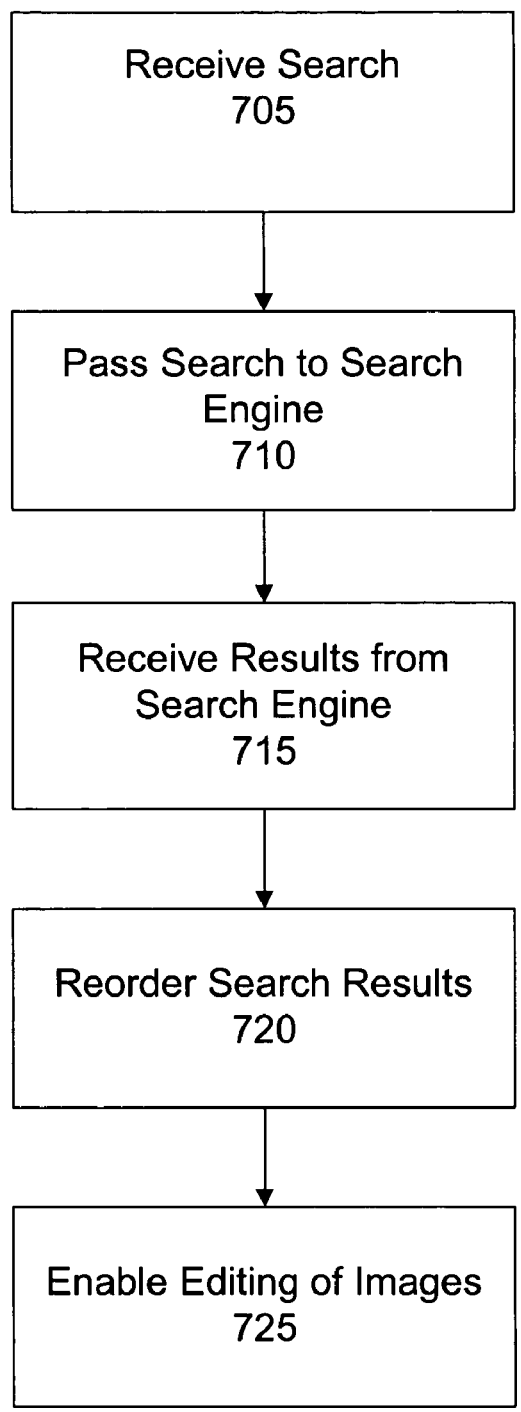
FIG. 7 is a flow chart illustrating an overview of a process for generating presentation-ready images.

FIG. 7 is a flow chart illustrating an overview of a process for generating presentation-ready images. The process begins with the conversion engine 315 receiving 705 a search from a user. In one embodiment, the source subjects 430 provide potential topics for the user. The conversion engine 315 then passes along 710 the search to the search engine 110. In one embodiment, the conversion engine includes an HTML parser that loads a home page for an image search engine such as Google and submits the search. In an alternate embodiment, the conversion engine 315 maintains a proprietary interface with the search engine 110. In yet another embodiment, the conversion engine 315 does not intercept the request.

The conversion engine then receives 715 the results from the search engine in the form of links to images. As part of step 715 the conversion engine 715 downloads the linked images. The conversion engine 715 then reorders 720 the search results. The reordering process includes the conversion module transforming the images to a vector based format as indicated in FIG. 9. The process also entails the reorder module 430 performing a weighted analysis on the search results, as is described in FIG. 8. The reordered images are then stored in the modified results 410. The editor module 325 then enables 725 a user to edit the returned images.

Figure 8:
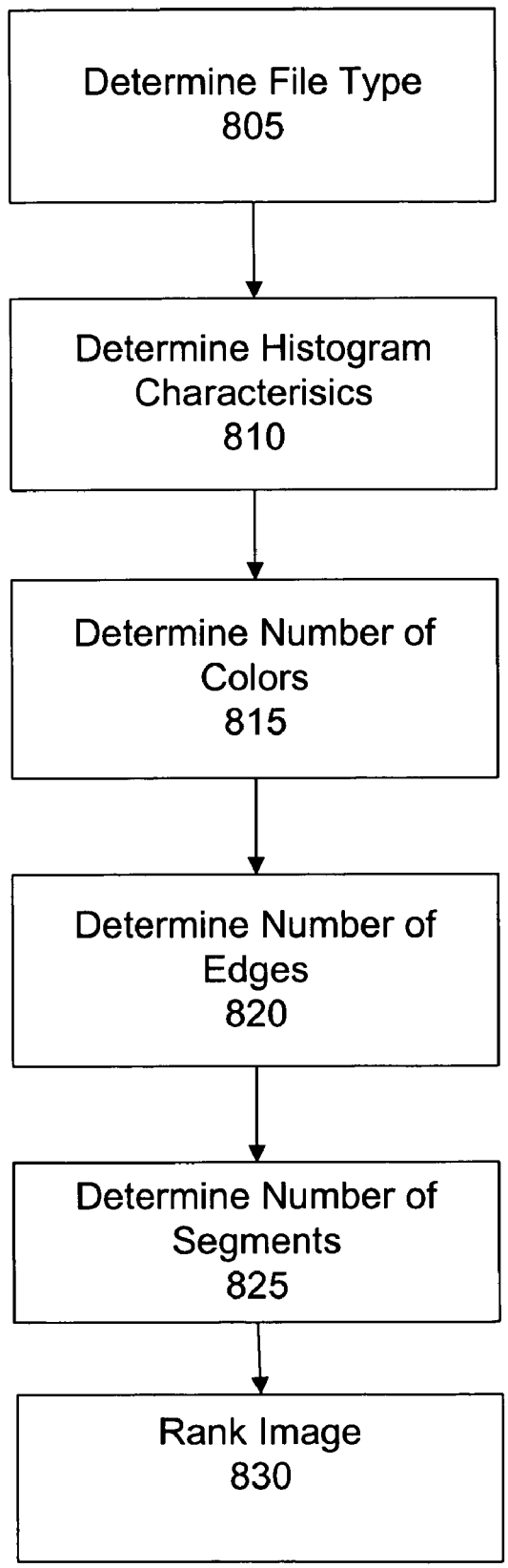
FIG. 8 is a flow chart illustrating an process for ranking image results according to ease of modification.
Figure 9:
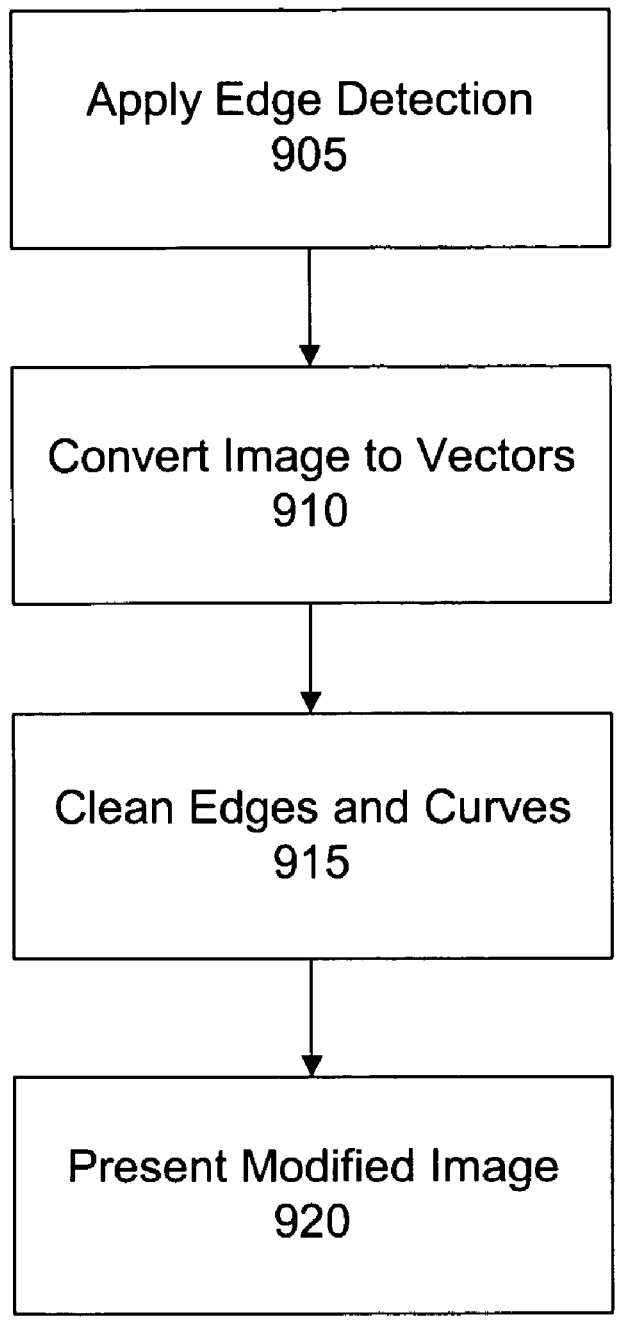
FIG. 9 is a flow chart illustrating a process for modifying converted images.

FIG. 8 is a flow chart illustrating a process for ranking image results according to a potential usability of the image. In one embodiment the images are ranked according to an ease of modifiability. In an alternate embodiment, the images are ranked according to a similarity to previously downloaded images, or a previously defined style of image. The process begins with the system determining 805 a file type for an image. The reorder module 420 can check a file name extension or some other characteristic of the file. The reorder module 420 then determines 810 the histogram characteristics for the image. The reorder module 420 determines a number of intensity peaks for the image, with a lower number of intensity peaks indicating a greater ease of modifiability. The reorder module then determines 815 a number of colors for the image, with a lower number of colors indicating a greater ease of modifiability.

The reorder module 420 then determines 820 a number of edges for the segment. A simple shape, such as a circle will have a low edge measurement, whereas complicated shapes like the outer edge of a facial drawing will have a high edge measurement. The number of edges will depend partially upon the representation algorithm, with some algorithms able to represent complicated curves as single edges.

The reorder module then determines 825 a number of segments, with a lower number indicating a higher ease of modifiability . As with edges, the number of segments will depend partially upon the representation algorithm, with some algorithms able to represent complicated curves as single segments. The reorder module 420 then ranks the image 830 based upon the factors above and the image's original search ranking. The reorder module 420 preferably applies a weighted analysis to determine the ease of modifiability of the image or similarity to other images, with the weights either predetermined or user-selected.

FIG. 9 is a flow chart illustrating a process for modifying converted images. The conversion module 425 first applies an edge detection process 905 that determines an overall shape for the image. The conversion module then converts 910 the image to a group of vectors or curve equations that represent the image.

The conversion module then cleans 915 the edges and curves of the image as per the process described in FIG. 5. Edges that are near each other are joined as single edges. The image is then presented 920 to the user as a search result.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for providing images, the method comprising:
   receiving at least one search result, the search result comprising an image, wherein the image includes an original rank, the original rank based on the relevance of the image within the search result;
   converting the image to a vector image, wherein the vector image comprises vector objects that represent the image, said vector objects including line segments;
   determining a usability of the vector image according to image qualities of the vector image;
   wherein determining the usability comprises determining an ease of modification, said ease of modification being a measurement of the ease by which the vector objects within the vector image can be modified based on the image qualities of the vector image; and
   assigning a new rank to the search result in response to the usability of the vector image.

2. The method of claim 1, wherein the usability comprises a similarity to previously acquired images.

3. The method of claim 1, wherein the usability comprises a similarity to an image style.

4. The method of claim 1 wherein determining a usability comprises applying a weighted analysis, said weighted analysis includes comparing the ease of modification to the original rank of the image.

5. The method of claim 1, wherein determining the ease of modification comprises determining a number of edges for the vector image, wherein a lower number of edges indicates a higher ease of modification.

6. The method of claim 1, wherein determining the ease of modification comprises determining a number of segments for the vector image, wherein a lower number of segments indicates a higher ease of modification.

7. The method of claim 1, wherein determining the ease of modification comprises determining a number of colors for the vector image, wherein a lower number of colors indicates a higher ease of modification.

8. The method of claim 1, wherein determining the ease of modification comprises determining histogram characteristics for the vector image, said histogram characteristics including intensity peaks, wherein a lower number of intensity peaks indicates a higher ease of modification.

9. The method of claim 1, wherein the vector image comprises connected segments of Benzier curves.

10. The method of claim 1, wherein the vector image comprise curve objects.

11. The method of claim 1, further comprising:
   providing an editor module whereby a user can edit the vector image, the editor module allowing the user to select a segment of the vector image to be modified and allowing the user to perform line-alteration operations on the selected segment to produce an edited version of the vector image.

12. A computer-readable medium having executable instructions stored thereon that performs the method of controlling a processor to provide images, comprising the steps of:
   receiving at least one search result, the search result comprising an image, wherein the image includes an original rank, the original rank based on the relevance of the image within the search result;

converting the image to a vector image, wherein the vector image comprises vector objects that represent the image, said vector objects including line segments;

determining a usability of the vector image according to image qualities of the vector image;

wherein determining the usability comprises determining an ease of modification, said ease of modification being a measurement of the ease by which the vector objects within the vector image can be modified based on the image qualities of the vector image; and assigning a new rank to the search result in response to the usability of the vector image.

13. The computer-readable medium of claim 12, wherein the instructions for determining a usability comprise instructions for determining one of the following:

a number of edges for the vector image, a number of segments for the vector image, a number of colors for the vector image and a number of intensity peaks for the vector image.

14. The computer-readable medium of claim 12, wherein the usability comprises a similarity to an image style.

15. A system for providing an image to a user, the system comprising:

a search result comprising an image;

a conversion engine configured to convert the image to a vector image, wherein the vector image comprises vector objects that represent the image, said vector objects including line segments; and a reorder module configured to:

determine a usability of the vector image associated with the search result according to image qualities of the vector image, wherein the usability comprises an ease of modification for the vector image, said ease of modification being a measurement of the ease by which the vector objects within the vector image can be modified based on the image qualities of the vector image; and assign a new rank to the search result in response to the usability.

16. The system of claim 15, wherein determining a usability comprises determining a number of edges for the vector image.

17. The system of claim 15, wherein determining a usability comprises determining a number of segments for the vector image.

18. The system of claim 15, wherein determining a usability comprises determining a number of colors for the vector image.

19. The system of claim 15, wherein determining a usability comprises determining a file format for the vector image.

20. The system of claim 15, wherein determining a usability comprises determining a number of intensity peaks for the vector image.

21. The system of claim 15, wherein the usability comprises an a similarity to previously acquired images.

22. The system of claim 15, wherein the usability comprises a similarity to an image style.

* * * * *